(No Model.)

A. G. MEAD.
RIVET.

No. 553,210.        Patented Jan. 14, 1896.

WITNESSES
J. M. Dolan.
M. Lynch.

INVENTOR
Albert G. Mead
by his Atty
Clarke & Raymond

UNITED STATES PATENT OFFICE.

ALBERT G. MEAD, OF BOSTON, MASSACHUSETTS.

RIVET.

SPECIFICATION forming part of Letters Patent No. 553,210, dated January 14, 1896.

Application filed March 6, 1893. Serial No. 464,731. (No model.)

*To all whom it may concern:*

Be it known that I, ALBERT G. MEAD, a citizen of the United States, residing at Boston, in the county of Suffolk and State of Massachusetts, have invented a new and useful Improvement in Rivets, of which the following is a full, clear, and exact description, reference being had to the accompanying drawings, forming a part of this specification, in explaining its nature.

My invention relates to a hollow rivet, and has to do especially with the shape of its entering or small end, whereby it is adapted to be driven through material without first forming a hole therein for its reception, and whereby also after such driving it is adapted, upon coming into contact with a surface sufficiently hard, to be upset with regularity practically continuously upon all sides of the shank and provide a good holding head or enlargement.

Figure 1:
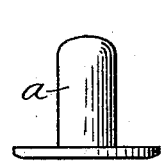
Figure 2:
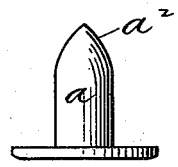
Figure 3:
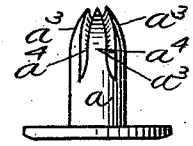
Figure 4:
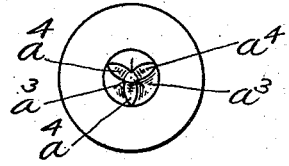
Figure 5:
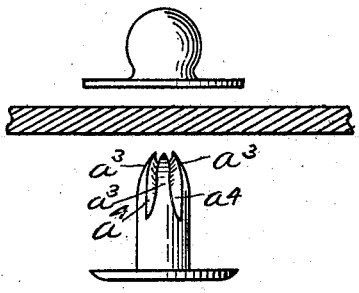
Figure 6:
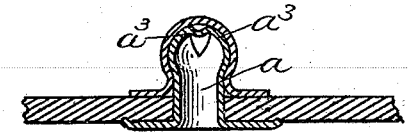

Referring to the drawings, Figure 1 is a view in elevation of a tubular rivet with an inclosed end. Fig. 2 is a view in elevation of the rivet with the end drawn or formed to a conical shape. Fig. 3 is a view in elevation of the completed rivet, the subject of my invention. Fig. 4 is a view in plan thereof. Fig. 5 is a view representing the relation of the rivet to the material and a ball member of a fastener which is to be attached by the rivet to the material. Fig. 6 is a sectional view showing the end of the rivet as passed through the material and enlarged in the cavity of the ball.

The rivet is of the kind formed by striking up from thin sheet metal. To provide it with the driving and heading end, it is desirable that the hollow shank $a$, which extends from the flange $a'$, should have a conical end $a^2$, and the rivet thus shaped is then subjected to the action of a die by which three incipient prongs or sections $a^3$ and three longitudinal diverging recesses $a^4$ are formed. These recesses extend from the point end of the shank, separate slightly the ends of the prongs and dispose of the metal of the shank of the rivet in such manner that partly-developed prongs of a conical shape are produced which have eccentric ends or tips. The ends of the various prong-sections are quite closely together and are almost straight upon their inner or opposing surfaces and are more inclined upon their outer surfaces. In forming these prongs the end of the rivet is not opened at all or to any appreciable extent. This construction provides the rivet, first, with an end of sufficient sharpness or penetrating ability to permit it to form its own hole as it is driven; second, it disposes of the metal below the point in such shape that the size of the shank is not increased; third, its points being eccentric and within the bore of the tube, and being also opposed to each other, upon striking or coming into contact with a hard surface, close together and compel the metal behind them to be bulged or formed outward to provide holding-anchors, the diverging lines of separation then developing sufficient weakness to permit each individual section or point to be thus turned and bulged outward.

In Fig. 6 I have represented the rivet as employed in securing a ball member of a fastener in place, the rivet having been driven through the material, its shank having been caused to enter the opening of the ball part, and its end having been brought into contact with the inner surface of the ball while held in a die and caused to be upset in the ball cavity.

Having thus fully described my invention, I claim and desire to secure by Letters Patent of the United States—

As an improved article of manufacture a driving tubular rivet having a flange, a hollow uncut shank, and an end separated into points by indented diverging longitudinal recesses, extending backward from the point end, as and for the purposes described.

ALBERT G. MEAD.

Witnesses:
F. F. RAYMOND, 2d,
J. M. DOLAN.